United States Patent
Hagino

(10) Patent No.: US 12,392,605 B2
(45) Date of Patent: Aug. 19, 2025

(54) METHOD OF ESTIMATING UNCERTAINTY OF COORDINATE MEASUREMENT

(71) Applicant: MITUTOYO CORPORATION, Kanagawa (JP)

(72) Inventor: Takeshi Hagino, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 339 days.

(21) Appl. No.: 17/967,128

(22) Filed: Oct. 17, 2022

(65) Prior Publication Data

US 2023/0127538 A1 Apr. 27, 2023

(30) Foreign Application Priority Data

Oct. 22, 2021 (JP) .................. 2021-173421

(51) Int. Cl.
   *G01B 21/04* (2006.01)
(52) U.S. Cl.
   CPC .................. *G01B 21/045* (2013.01)
(58) Field of Classification Search
   CPC .................. G01B 21/045
   See application file for complete search history.

(56) References Cited

U.S. PATENT DOCUMENTS 10,466,029 B2 * 11/2019 Fuchs .................. G01B 21/045
2014/0157861 A1    6/2014 Jonas et al.

FOREIGN PATENT DOCUMENTS

| JP | 2002-267436 A | 9/2002 |
| JP | 2014-527170 | 10/2014 |
| WO | WO2013/021157 | 2/2013 |

OTHER PUBLICATIONS

"Geometrical product specification (GPS)—Acceptance and reverification tests for coordinate measuring machines (CMM)—Part 2: CMMs used for measuring linear dimensions", Japanese Industrial Standard JIS, B 7440-2:2013 (ISO 10360-2:2009) (w/ translation).
Office Action issued in Corresponding JP Patent Application No. 2021-173421, dated Jun. 17, 2025, along with an English translation thereof.

* cited by examiner

*Primary Examiner* — Shelby A Turner
*Assistant Examiner* — Xiuqin Sun
(74) *Attorney, Agent, or Firm* — Greenblum & Bernstein, P.L.C.

(57) ABSTRACT

An uncertainty estimation method including: acquiring first variable values, which are a plurality of variable values included in a function indicating a relationship between a measurement dimension and a maximum permissible length measurement error when a predetermined measurement condition value of a coordinate measuring machine is a first value, and second variable values, which are the plurality of variable values occurring when the measurement condition value is a second value; calculating a maximum permissible length measurement error corresponding to a third value by calculating the variable values occurring when the measurement condition value is the third value on the basis of the plurality of first variable values and the plurality of second variable values; and estimating the measurement uncertainty of the coordinate measuring machine on the basis of the calculated maximum permissible length measurement error.

4 Claims, 8 Drawing Sheets

METHOD OF ESTIMATING UNCERTAINTY OF COORDINATE MEASUREMENT

CROSS-REFERENCE TO RELATED APPLICATIONS

The present application claims priority to Japanese Patent Application number 2021-173421 filed on Oct. 22, 2021. The contents of this application are incorporated herein by reference in their entirety.

BACKGROUND OF THE INVENTION

A method of estimating measurement uncertainty of a CMM using the maximum permissible length measurement error of the CMM has been proposed (e.g., Patent Document 1: Japanese Unexamined Patent Application No. 2002-267436). The maximum permissible length measurement error of the CMM is described in product specifications of the CMM (e.g., Non-Patent Document 1, "Geometrical Product Specifications (GPS)—Acceptance and reverification tests for coordinate measuring machines (CMM)—Part 2: CMMs used for measuring linear dimensions," Japanese Industrial Standards JIS, B 7440-2: 2013 (ISO 10360-2: 2009), [online], Internet <URL: https://kikakurui.com/b7/B7440-2-2013-01.html>), for example.

BRIEF SUMMARY OF THE INVENTION

In product specifications of a CMM written in accordance with Non-Patent Document 1, a function for calculating the maximum permissible length measurement error when a measurement condition value such as a ram axis stylus tip offset or an ambient temperature is a predetermined value is described. In the method described in Patent Document 1, there is a problem that estimation accuracy of measurement uncertainty of a CMM decreases when the ram axis stylus tip offset, the ambient temperature, or the like is different from a value described in product specifications because a difference occurs between (i) a numerical value obtained by calculating the maximum permissible length measurement error using the function described in Non-Patent Document 1 and (ii) actual characteristics of the CMM.

The present disclosure focuses on this point, and its object is to provide an uncertainty estimation method and a storage medium storing a program for improving estimation accuracy of measurement uncertainty of a CMM when the ram axis stylus tip offset, the ambient temperature, or the like is different from a value described in product specifications.

An uncertainty estimation method according to a first aspect of the present disclosure is an uncertainty estimation method for estimating measurement uncertainty of a coordinate measuring machine, including: acquiring a plurality of first variable values, which are a plurality of variable values included in a function indicating a relationship between a measurement dimension and a maximum permissible length measurement error when a predetermined measurement condition value of the coordinate measuring machine or an operating environment of the coordinate measuring machine is a first value, and a plurality of second variable values, which are the plurality of variable values occurring when the measurement condition value is a second value; calculating a maximum permissible length measurement error corresponding to a third value by calculating the plurality of variable values occurring when the measurement condition value is the third value, on the basis of the plurality of first variable values occurring when the measurement condition value is the first value and the plurality of second variable values occurring when the measurement condition value is the second value; and estimating the measurement uncertainty of the coordinate measuring machine on the basis of the calculated maximum permissible length measurement error, that are executed by the coordinate measuring machine.

A non-transitory storage medium according to a second aspect of the present disclosure stores a program for estimating measurement uncertainty of a coordinate measuring machine, the program causing a computer to execute: acquiring a plurality of first variable values, which are a plurality of variable values included in a function indicating a relationship between a measurement dimension and a maximum permissible length measurement error when a predetermined measurement condition value of the coordinate measuring machine or an operating environment of the coordinate measuring machine is a first value, and a plurality of second variable values, which are the plurality of variable values occurring when the measurement condition value is a second value; calculating a maximum permissible length measurement error corresponding to a third value by calculating the plurality of variable values occurring when the measurement condition value is the third value on the basis of the plurality of first variable values occurring when the measurement condition value is the first value and the plurality of second variable values occurring when the measurement condition value is the second value; and estimating the measurement uncertainty of the coordinate measuring machine on the basis of the calculated maximum permissible length measurement error.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

First Embodiment

[Outline of a Coordinate Measuring Machine]

A coordinate measuring machine (CMM) according to a first embodiment measures a three-dimensional geometry of an object to be measured. The CMM estimates a measurement uncertainty that quantitatively indicates a degree of variation in a measurement result of the three-dimensional geometry obtained by the CMM. Some CMMs (for example, see Patent Document 1) use the maximum permissible length measurement error to estimate the uncertainty in the measurement performed by the CMM using a known method, for example.

Figure 1A:
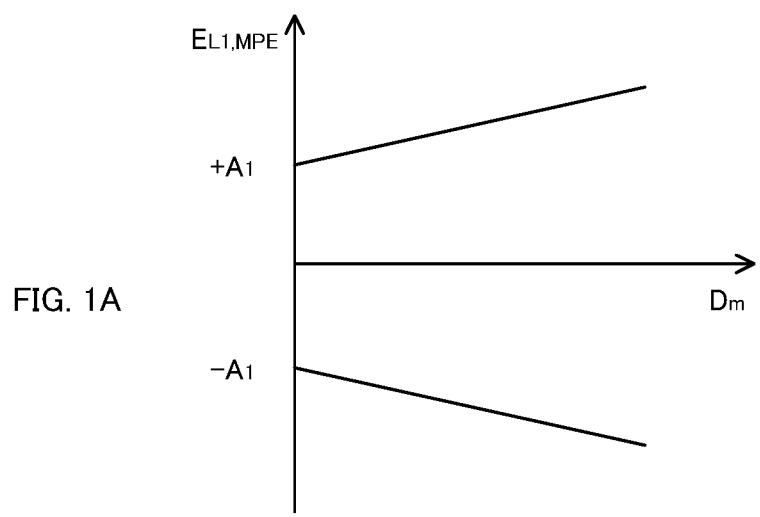
FIGS. 1A to 1C each show a relationship between a measurement dimension and a maximum permissible length measurement error used for estimating uncertainty in measurement performed by a CMM.
Figure 1B:
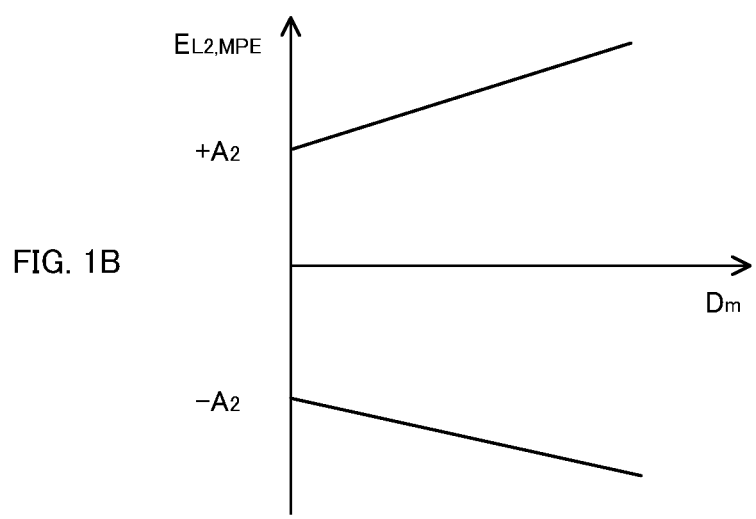
Figure 1C:
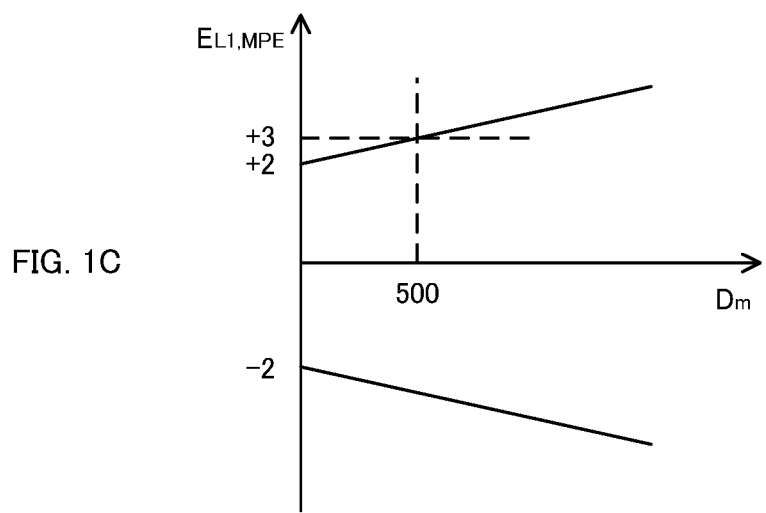

FIGS. 1A to 1C each show a relationship between a measurement dimension $D_m$ and a maximum permissible length measurement error $E_{L,MPE}$ used for estimating the uncertainty in the measurement performed by the CMM. The horizontal axis of FIG. 1A indicates the measurement dimension $D_m$, and the vertical axis of FIG. 1A indicates a maximum permissible length measurement error $E_{L1,MPE}$ when a ram axis stylus tip offset L is a first value $L_1$. The measurement dimension $D_m$ is a distance between two points on the object to be measured obtained by measuring the object to be measured with the CMM, for example. The unit of the measurement dimension $D_m$ is millimeters.

The maximum permissible length measurement error is obtained using the following equation:

$$E_{L,MPE} = \pm(A_L + D_m/K_L) \quad \text{[Equation 1]}$$

In Equation 1, $E_{L,MPE}$ is the maximum permissible length measurement error. $A_L$ and $1/K_L$ are positive variable values provided by a manufacturer of the CMM. $A_L$ and $1/K_L$ change in accordance with a measurement condition value such as the ram axis stylus tip offset L.

The variable value $A_L$ (not shown) in Equation 1 represents an intercept at the measurement dimension 0 of a function indicating the relationship between the measurement dimension of the CMM and the maximum permissible length measurement error. The variable value $1/K_L$ represents a proportionality coefficient of a measurement error. The measurement error changes in proportion to the measurement dimension of the function indicating the relationship between the measurement dimension of the CMM and the maximum permissible length measurement error. In the example of FIG. 1A, it is assumed that the variable value $A_L$ is a first variable value $A_1$ when the ram axis stylus tip offset L is the first value $L_1$.

FIG. 1B shows a change in a maximum permissible length measurement error $E_{L2,MPE}$ when the ram axis stylus tip offset L is a second value $L_2$. It is assumed that the variable value $A_L$ is a second variable value $A_2$ when the ram axis stylus tip offset L is the second value $L_2$.

For example, when the ram axis stylus tip offset L is the first value $L_1$, it is assumed that $A_L=2$ and $K_L=500$ are given in Equation 1. When $A_L=2$ and $K_L=500$ are substituted in Equation 1, the following is obtained:

$$E_{L1,MPE} = \pm(2 + D_m/500) \quad \text{[Equation 2]}$$

FIG. 1C shows a change in the maximum permissible length measurement error $E_{L1,MPE}$ corresponding to Equation 2. When the measurement dimension $D_m$ is assumed to be 500 millimeters, the maximum permissible length measurement error $E_{L1,MPE}$ can be obtained as ±3 micrometers by substituting $D_m=500$ in Equation 2.

The CMM acquires a plurality of first variable values ($A_1$, $1/K_1$) included in Equation 1 from the storage when the measurement condition value such as the ram axis stylus tip offset is a first value, and acquires a plurality of second variable values ($A_2$, $1/K_2$) included in Equation 1 from the storage when the measurement condition value is a second value. The CMM calculates a plurality of variable values ($A_3$, $1/K_3$) when the measurement condition value is a third value, using the acquired plurality of first variable values ($A_1$, $1/K_1$) and the acquired plurality of second variable values ($A_2$, $1/K_2$). By calculating a maximum permissible length measurement error $E_{3,MPE}$ when the measurement condition value is the third value on the basis of the plurality of variable values ($A_3$, $1/K_3$) when the measurement condition value is the third value, the CMM estimates the uncertainty in the measurement performed by the CMM when the measurement condition value is the third value.

There are some CMMs that can automatically change the direction in which a probe extends. Also, there are some CMMs that include a plurality of styluses extending in mutually different directions. The ram axis stylus tip offset L changes by having the orientation of the probe changed or by having the styluses used for measurement switched in such CMMs.

The CMM estimates uncertainty in the measurement performed by a CMM 100 corresponding to any measurement condition value using the plurality of first variable values included in Equation 1 when the measurement condition value such as the ram axis stylus tip offset is the first value and the plurality of second variable values included in Equation 1 when the measurement condition value is the second value. In this way, the CMM can improve the accuracy of estimating the measurement uncertainty of the CMM when the measurement condition value differs from the value stored as the product specifications in the storage.

[Configuration of the CMM]

Figure 2:
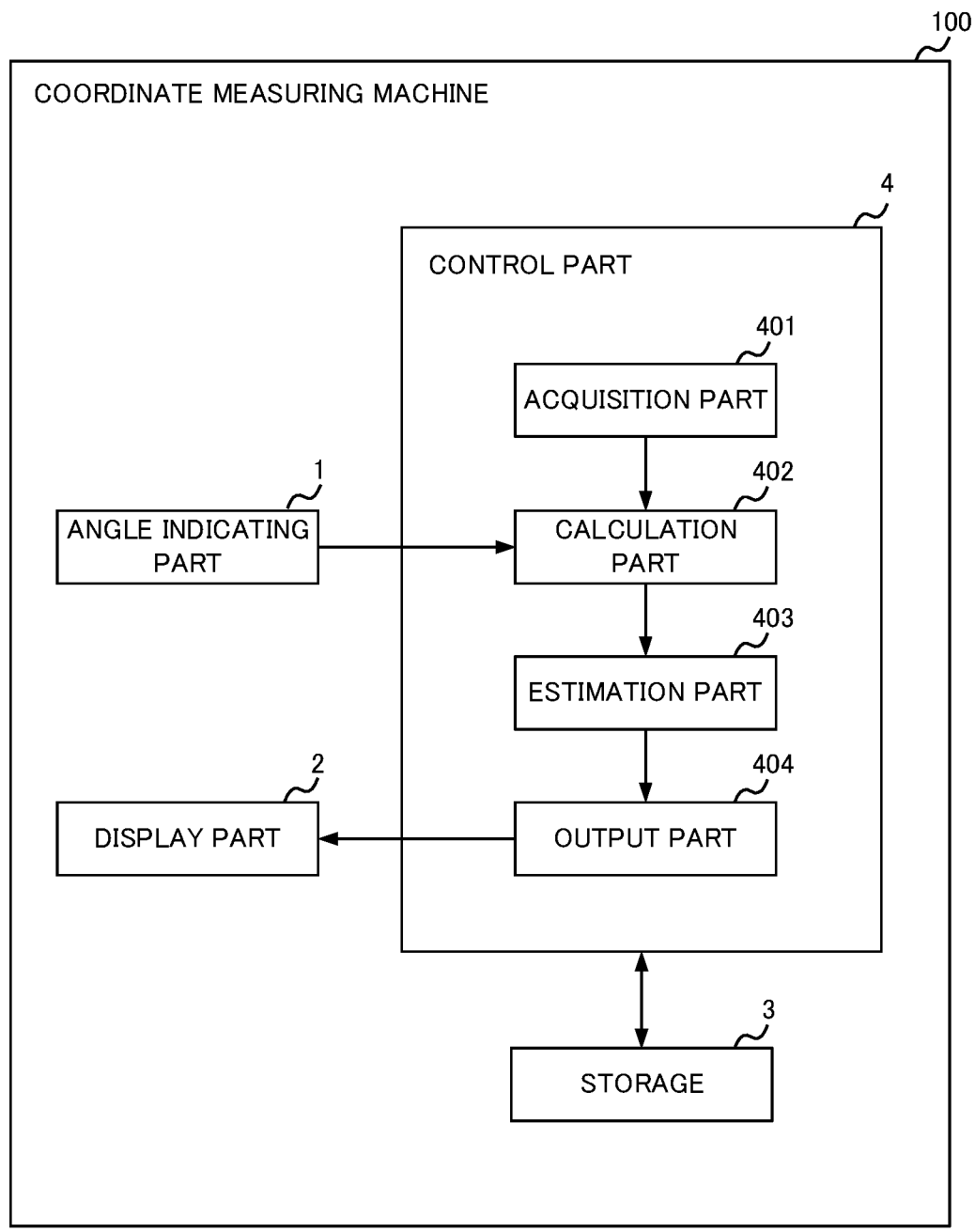
FIG. 2 shows a configuration of the CMM.

FIG. 2 shows a configuration of the CMM 100. The CMM 100 includes an angle indicating part 1, a display part 2, a storage 3, and a control part 4. It is assumed that the CMM 100 can change the orientation of the probe.

The angle indicating part 1 detects the orientation of the probe. For example, the angle indicating part 1 is a sensor that detects, as an angle that indicates the orientation of the probe, (i) an angle between the ram axis and the probe and (ii) an angle that indicates the orientation of the probe in the horizontal plane. The angle indicating part 1 inputs the detected orientation of the probe to the control part 4. The display part 2 displays characters and images. For example, the display part 2 displays measurement results of a geometry of the object to be measured and estimation results of the uncertainty in the measurement performed by the CMM 100.

The storage 3 includes a storage medium including a read only memory (ROM), a random access memory (RAM), a hard disk, and the like. The storage 3 stores a program executed by the control part 4. The control part 4 is a central processing unit (CPU), for example. The control part 4 functions as an acquisition part 401, a calculation part 402, an estimation part 403, and an output part 404 by executing the program stored in the storage 3.

[Acquisition of the Variable Value]

The acquisition part 401 acquires a plurality of variable values which are included in the function indicating the relationship between the measurement dimension and the maximum permissible length measurement error. For example, the acquisition part 401 acquires the plurality of valuable values included in the function as first variable values occurring when a predetermined measurement condition value of the CMM 100 is a first value. Also, the acquisition part 401 may acquire the plurality of valuable values included in the function as the first variable values occurring when a predetermined measurement condition value of an operating environment of the CMM 100, instead of the measurement condition value of the CMM itself, is the first value. In cases described in the present application, the function is as shown by the foregoing Equation 1. For example, the acquisition part 401 acquires a plurality of first variable values ($A_1$, $1/K_1$) included in the function of Equation 1 when the ram axis stylus tip offset L, as an example of the measurement condition value, is the first value. The first value is 0 millimeters, for example.

The acquisition part 401 acquires, as second variable values, a plurality of variable values included in the same function indicating the relationship between the measurement dimension and the maximum permissible length measurement error when the measurement condition value of the CMM is the second value. For example, the acquisition part 401 acquires a plurality of second variable values ($A_2$, $1/K_2$) included in the function of Equation 1 when the ram axis stylus tip offset L is the second value. The second value is 150 millimeters, for example.

Figure 3A:
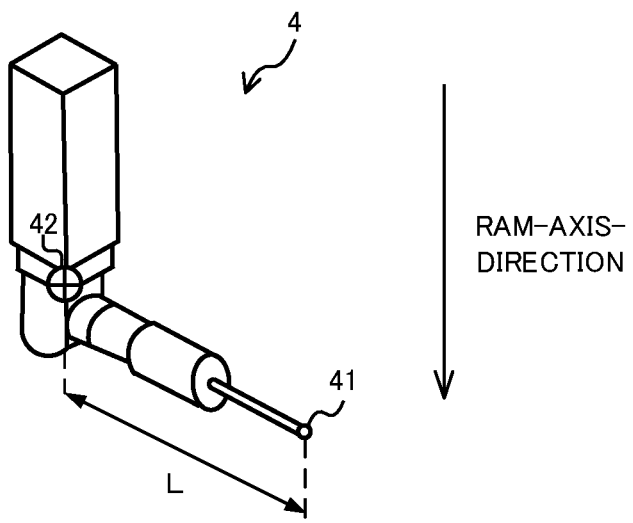
FIGS. 3A and 3B each show an example of a change in a ram axis stylus tip offset.
Figure 3B:
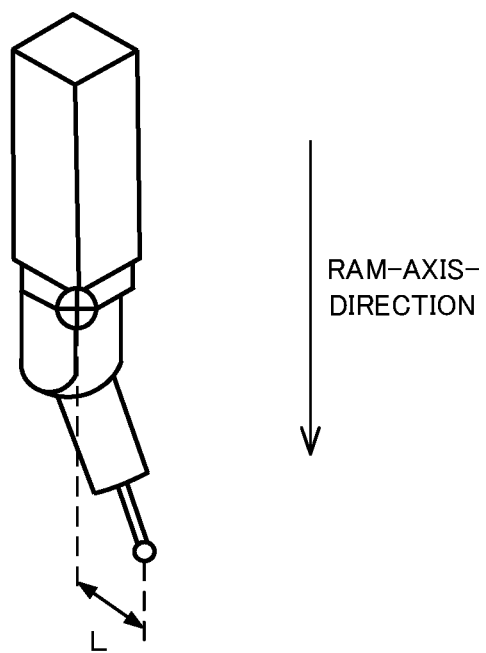

FIGS. 3A and 3B each show an example of a change in the ram axis stylus tip offset L. As shown in FIG. 3A, a stylus 41 is attached to the tip of the probe of the CMM 100. A ram-axis-direction is indicated by an arrow. The ram axis stylus tip offset L is a distance corresponding to a direction orthogonal to the ram-axis-direction between the stylus 41 and a reference point 42.

In the CMM 100, when the orientation of the probe is changed, the ram axis stylus tip offset L changes. For example, as shown in FIGS. 3A to 3B, when the orientation of the probe is changed, the ram axis stylus tip offset changes in accordance with the orientation of the probe.

In the storage 3, a first value of the ram axis stylus tip offset L, a first variable value $A_1$ of Equation 1 and a first variable value $1/K_1$ of Equation 1 are associated with each other and stored as the product specifications. In the storage 3, a second value of the ram axis stylus tip offset L, a second variable value $A_2$ of Equation 1 and a second variable value $1/K_2$ of Equation 1 are associated with each other and stored as the product specifications.

The acquisition part 401 acquires the first variable value $A_1$ and the first variable value $1/K_1$ associated with the first value of the ram axis stylus tip offset L in the storage 3. The acquisition part 401 acquires the second variable value $A_2$ and the second variable value $1/K_2$ associated with the second value of the ram axis stylus tip offset L in the storage 3.

[Calculation 1 of the Variable Value]

The calculation part 402 calculates a plurality of variable values occurring when the measurement condition value is a third value, on the basis of (i) the plurality of first variable values occurring when the measurement condition value such as the ram axis stylus tip offset L is the first value and the plurality of second variable values occurring when the measurement condition value is the second value.

Figure 4A:
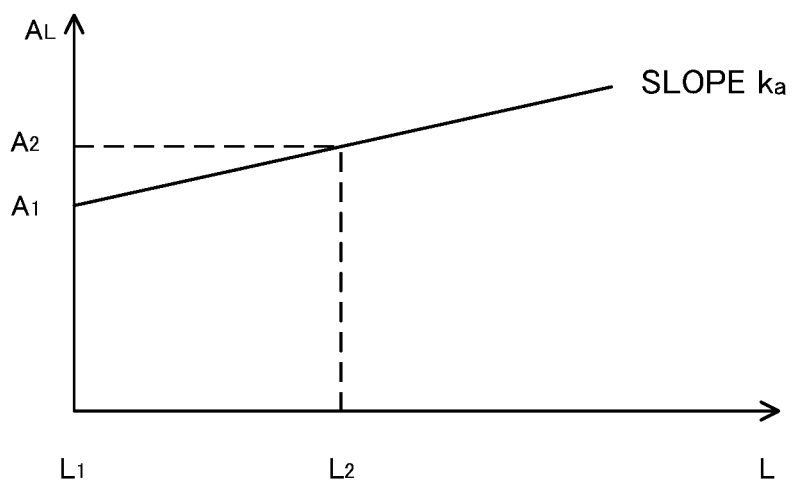
FIGS. 4A and 4B each show a relationship between the ram axis stylus tip offset and a variable value.
Figure 4B:
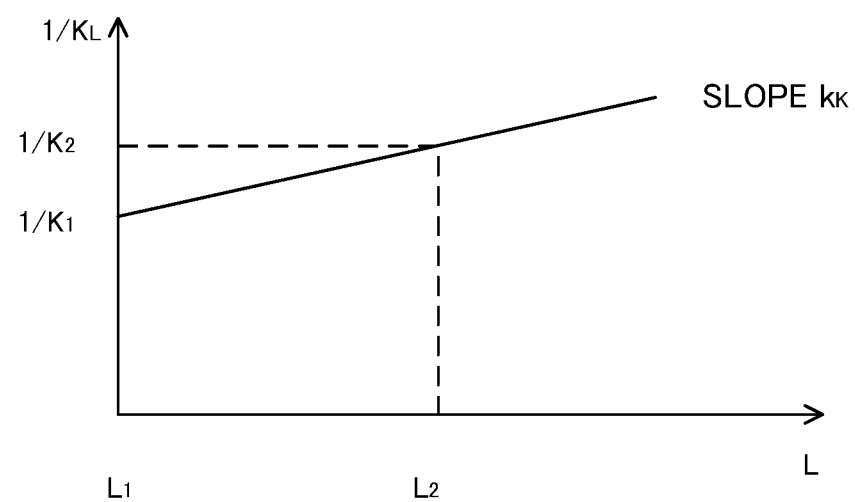

FIGS. 4A and 4B each show a relationship between the ram axis stylus tip offset L and the variable value. FIG. 4A shows a relationship between the ram axis stylus tip offset L and the variable value $A_L$. FIG. 4B shows a relationship between the ram axis stylus tip offset L and the variable value $1/K_L$.

The horizontal axis of FIG. 4A is the ram axis stylus tip offset L, and the vertical axis of FIG. 4A is the variable value $A_L$. In the examples of FIGS. 4A and 4B, it is assumed that the variable values $A_L$ and $K_L$ change linearly. Among factors that change the variable values $A_L$ and $K_L$, the major ones are due to measurement errors caused by characteristics such as a deflection of the probe and a motion error of the roll angle of the ram axis. These errors are expected to change generally linearly with respect to the ram axis stylus tip offset L.

Therefore, the variable value $A_L$ can be expressed in FIG. 4A as:

$$A_L = A_1 + k_a \cdot (L - L_1)$$ [Equation 3]

Here, in the straight line of FIG. 4A, the variable value $A_L$ when the ram axis stylus tip offset L is the first value $L_1$ is the first variable value $A_1$, and the variable value $A_L$ when the ram axis stylus tip offset L is the second value $L_2$ is the second variable value $A_2$. In the example of FIG. 4A, the first value $L_1 = 0$.

The calculation part 402 calculates a slope $k_a$ of FIG. 4A with the following equation:

$$k_a = (A_2 - A_1)/(L_2 - L_1)$$ [Equation 4]

In this way, the calculation part 402 can calculate the variable value $A_L$ corresponding to any ram axis stylus tip offset L with Equation 3 and Equation 4.

The horizontal axis of FIG. 4B is the ram axis stylus tip offset L, and the vertical axis of FIG. 4B is the variable value $1/K_L$. In FIG. 4B, the variable $1/K_L$ can be expressed as:

$$1/K_L = 1/K_1 + k_K \cdot (L - L_1)$$ [Equation 5]

In the straight line of FIG. 4B, the variable value $A_L$ when the ram axis stylus tip offset L is the first value $L_1$ is the first variable value $1/K_1$, and the variable value $1/K_L$ when the ram axis stylus tip offset L is the second value $L_2$ is the second variable value $1/K_2$. In the example of FIG. 4B, the first value $L_1 = 0$.

The calculation part 402 calculates a slope $k_K$ of the straight line shown in FIG. 4B with the following equation:

$$k_K = (1/K_1 - 1/K_2)/(L_2 - L_1)$$ [Equation 6]

Therefore, the calculation part 402 can calculate the variable value $1/K_L$ corresponding to any ram axis stylus tip offset L with Equation 5 and Equation 6.

The calculation part 402 calculates the plurality of variable values occurring when the measurement condition value is the third value by interpolation or extrapolation on the basis of the plurality of first variable values occurring when the measurement condition value is the first value and the plurality of second variable values occurring when the measurement condition value is the second value. By calculating the plurality of variable values occurring when the measurement condition value is the third value, the calculation part 402 calculates the maximum permissible length measurement error corresponding to the third value.

Figure 5A:
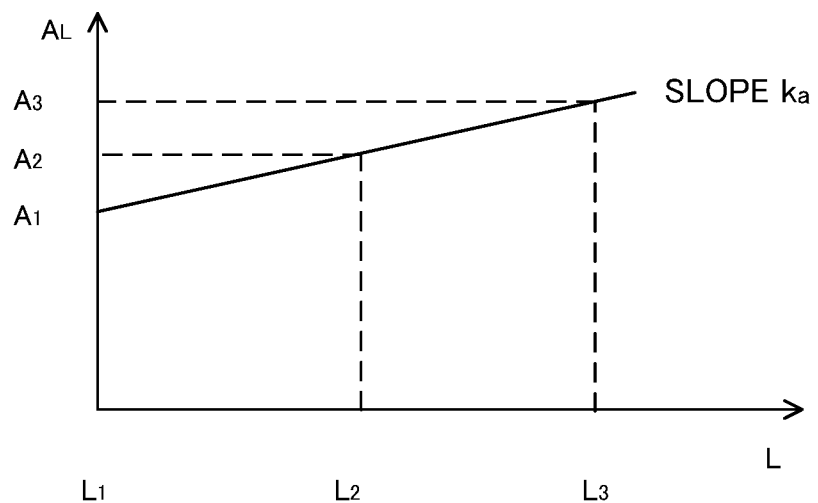
FIGS. 5A and 5B each show an example of a calculation of the variable value by a calculation part.
Figure 5B:
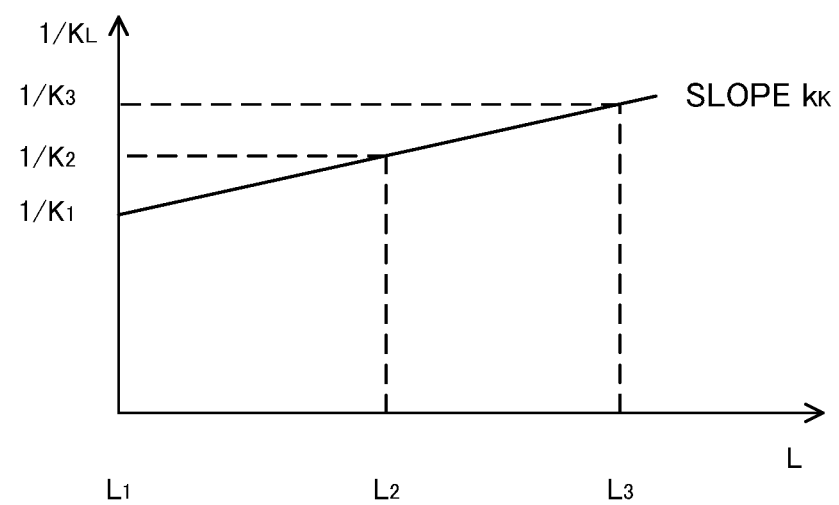

FIGS. 5A and 5B each show an example of a calculation of variable values by the calculation part 402. FIG. 5A shows the relationship between the ram axis stylus tip offset L and the variable value $A_L$. FIG. 5B shows the relationship between the ram axis stylus tip offset L and the variable value $1/K_L$.

In the example of the first embodiment, the calculation part 402 detects the third value $L_3$ of the ram axis stylus tip offset L on the basis of detection results of the angle indicating part 1. Since $L2 < L3$ in the example of FIG. 5A, the calculation part 402 calculates the variable value $A_3$ occurring when the ram axis stylus tip offset L is the third value $L_3$ by extrapolation using Equation 3 and Equation 4. When $L_1 \leq L_3 \leq L_2$, the calculation part 402 calculates the variable value $A_3$ occurring when the ram axis stylus tip offset L is the third value $L_3$ by interpolation using Equations 3 and 4.

Similarly, since $L_2 < L_3$ in the example of FIG. 5B, the calculation part 402 calculates the variable value $1/K_3$ occurring when the ram axis stylus tip offset L is the third value $L_3$ by extrapolation using Equation 5 and Equation 6. When $L_1 \leq L_3 \leq L_2$, the calculation part 402 calculates the variable value $1/K_3$ occurring when the ram axis stylus tip offset L is the third value $L_3$ by interpolation using Equation 5 and Equation 6.

By substituting the calculated variable value $A_L = A_3$ and the variable value $1/K_L = 1/K_3$ in Equation 1, the calculation part 402 calculates the maximum permissible length measurement error $E_{L,MPE}$ corresponding to the ram axis stylus tip offset $L_3$. The calculation part 402 notifies the estimation part 403 of the calculated maximum permissible length measurement error $E_{L,MPE}$.

[Calculation of the Variable Value when the First Variable Value and the Second Variable Value are Constant]

Figure 6A:
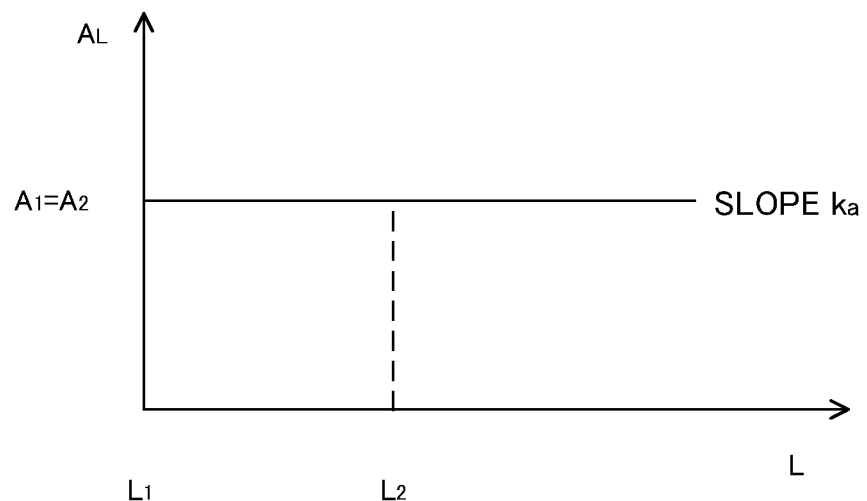
FIGS. 6A and 6B each show an example where $A_1=A_2$ in product specifications stored in a storage.
Figure 6B:
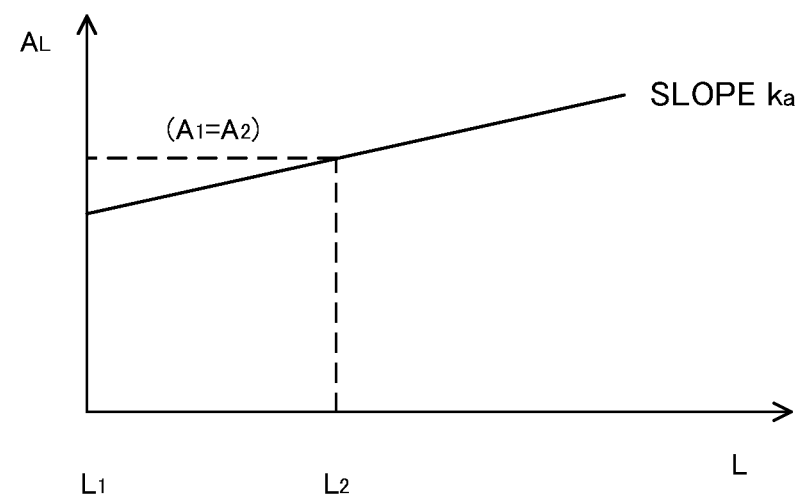

A method of calculating the variable value $A_L$ when (i) the first variable value $A_1$ occurring when the ram axis stylus tip offset acquired by the acquisition part 401 is the first value $L_1$ and (ii) the second variable value $A_2$ occurring when the ram axis stylus tip offset is the second value $L_2$ are the same will be described. FIGS. 6A and 6B each show an example where $A_1 = A_2$ in the product specifications stored in the storage 3. The reason why $A_1 = A_2$ in the product specifications is that even though the true value of the variable value $A_L$ is constant, as shown in FIG. 6A, or the true value of $A_L$ changes in accordance with the ram axis stylus tip offset L, as shown in FIG. 6B, there is a case where the product specifications only indicate the worst value of $A_L$ in $L_1 \leq L \leq L_2$.

When the true value of the variable value $A_L$ is constant as shown in FIG. 6A, the calculation part 402 calculates the variable value $A_L$ considering that $A_L = A_1$ for any ram axis stylus tip offset L. Even when the true value of the variable value $A_L$ changes as shown in FIG. 6B, values other than the first variable value $A_1$ and the second variable value $A_2$ stored in the product specifications cannot be obtained. Therefore, it is safe for the calculation part 402 to consider the variable value $A_L$ to be constant, in a similar manner as with FIG. 6A.

The estimation part 403 estimates the uncertainty in the measurement performed by the CMM 100 using a known method on the basis of the maximum permissible length measurement error calculated by the calculation part 402 (for example, see Patent Document 1). The estimation part 403 notifies the output part 404 of the estimated uncertainty in the measurement performed by the CMM 100.

The output part 404 outputs the uncertainty in the measurement performed by the CMM 100 estimated by the estimation part 403 to the display part 2. For example, the output part 404 outputs, to the display part 2, the measurement results of the object to be measured by the CMM 100 along with the measurement uncertainty corresponding to the measurement results. The control part 4 controls a measuring mechanism of the CMM 100 to execute measurement by the CMM 100 when the estimated uncertainty is less than a predetermined threshold and to stop the measurement by the CMM 100 when the estimated uncertainty is equal to or greater than the predetermined threshold.

[Processing Procedure of Estimating Uncertainty in a Measurement Performed by the CMM]

Figure 7:
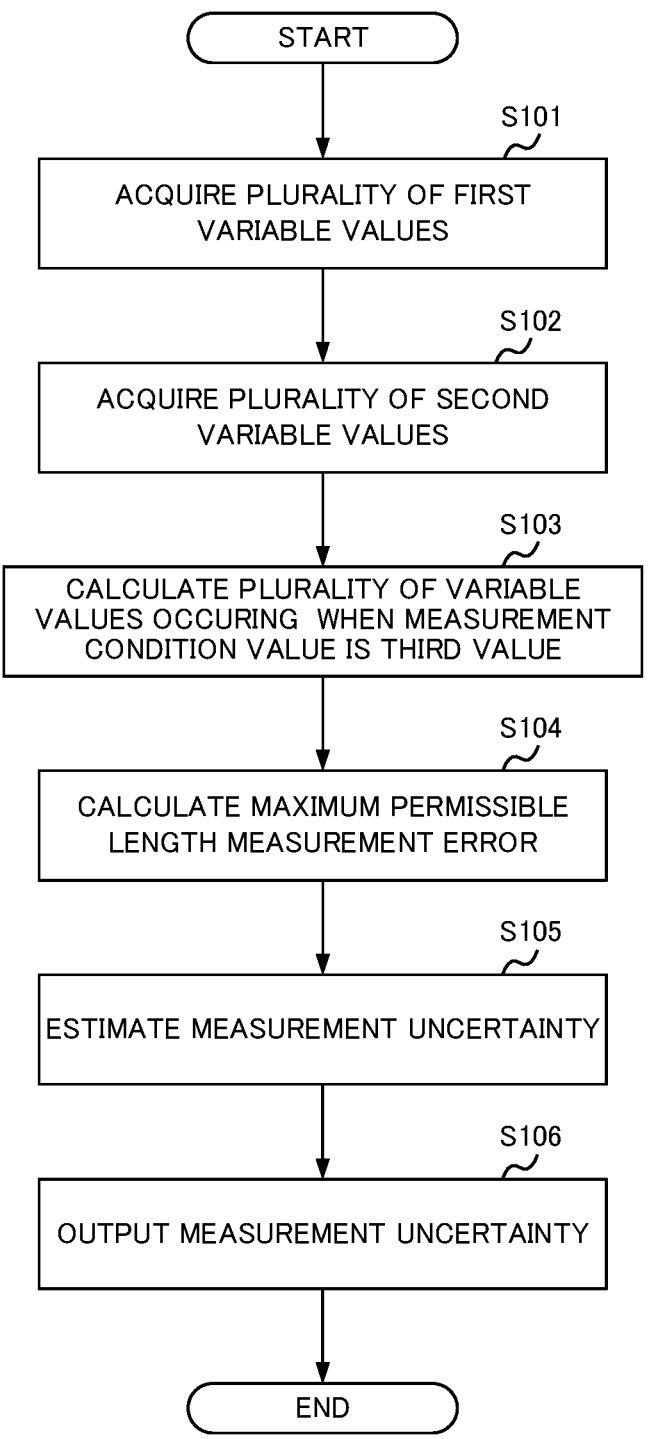
FIG. 7 is a flowchart showing a processing procedure of estimating the uncertainty in the measurement performed by the CMM.

FIG. 7 is a flowchart showing a processing procedure of estimating uncertainty in a measurement performed by the CMM 100. This processing procedure starts when an operation reception part (not shown) of the CMM 100 receives a user's operation instructing to start measuring the geometry of the object to be measured, for example.

First, the acquisition part 401 acquires a plurality of first variable values which are a plurality of variable values included in a function indicating a relationship between a measurement dimension and a maximum permissible length measurement error occurring when a measurement condition value such as a ram axis stylus tip offset L is a first value (S101). Next, when the measurement condition value is a second value, the acquisition part 401 acquires a plurality of second variable values that are a plurality of variable values included in the same function (S102).

The calculation part 402 calculates a plurality of variable values occurring when the measurement condition value is a third value, on the basis of the plurality of first variable values and the plurality of second variable values (S103). The calculation part 402 calculates a maximum permissible length measurement error corresponding to the third value on the basis of the plurality of variable values occurring when the measurement condition value is the third value (S104). The estimation part 403 estimates, on the basis of the maximum permissible length measurement error calculated by the calculation part 402, uncertainty in the measurement performed by the CMM 100 (S105). The output part 404 outputs the uncertainty in the measurement performed by the CMM 100 estimated by the estimation part 403 to the display part 2 (S106).

[Effect of the CMM According to the First Embodiment]

According to the first embodiment, the calculation part 402 calculates the maximum permissible length measurement error $E_{L,MPE}$ corresponding to the third value by calculating the plurality of variable values occurring when the measurement condition value is the third value using the plurality of first variable values and the plurality of second variable values acquired by the acquisition part 401. The estimation part 403 estimates the uncertainty in the measurement performed by the CMM 100 using the maximum permissible length measurement error $E_{L,MPE}$ calculated by the calculation part 402. By doing this, the estimation part 403 can improve estimation accuracy of the measurement uncertainty of the CMM 100 when the measurement condition value is different from the value stored as the product specifications in the storage 3.

Second Embodiment

In the first embodiment, the example in which the predetermined measurement condition value of the CMM or the operating environment of the CMM is the ram axis stylus tip offset L has been described. In a second embodiment, an example in which the measurement condition value indicates a range of temperature variation in the operating environment of the CMM 100 will be described.

The acquisition part 401 acquires a plurality of first variable values included in a function indicating a relationship between a measurement dimension and a maximum permissible length measurement error when a measurement condition value indicating the range of temperature variation in the operating environment of the CMM 100 is a first value. When the measurement condition value indicating this range is a second value, the acquisition part 401 acquires a plurality of second variable values included in the function. In the example of the second embodiment, the range of temperature variation in the operating environment of the CMM 100 is expressed as 20° C.±T° C., and T is the measurement condition value.

The plurality of variable values included in the function of Equation 1 indicating the relationship between the measurement dimension and the maximum permissible length measurement error change in accordance with a measurement condition value T. Since the variable values included in Equation 1 change in accordance with the measurement condition value T, Equation 1 can be rewritten as:

$$E_{(T),MPE} = I(A_{(T)} + D_m/K_{(T)}) \quad \text{[Equation 7]}$$

$E_{(T),MPE}$ is the maximum permissible length measurement error that changes depending on the measurement condition value T. $A_{(T)}$ and $K_{(T)}$ are variable values that change depending on the measurement condition value T.

In the storage 3, a first value $T_1$ of the measurement condition value T, a first variable value $A_{(T1)}$ included in Equation 7 corresponding to the first value $T_1$, and a first variable value $1/K_{(T1)}$ included in Equation 7 are stored in association with each other. In the storage 3, a second value $T_2$ of the measurement condition value T, a second variable value $A_{(T2)}$ included in Equation 7 corresponding to the second value $T_2$, and a second variable value $1/K_{(T2)}$ included in Equation 7 are stored in association with each other. The measurement condition value $T_1$ is 2° C., for example. The measurement condition value $T_2$ is 3° C., for example.

The acquisition part 401 acquires the first variable value $A_{(T1)}$ and the first variable value $1/K_{(T1)}$ that are associated with the first value $T_1$ in the storage 3. The acquisition part 401 acquires the second variable value $A_{(T2)}$ and the second variable value $1/K_{(T2)}$ that are associated with the second value $T_2$ in the storage 3. The acquisition part 401 notifies the calculation part 402 of the plurality of acquired first variable values ($A_{(T1)}$, $1/K_{(T1)}$) and the plurality of acquired second variable values ($A_{(T2)}$, $1/K_{(T2)}$).

[Calculation 2 of the Variable Value]

The calculation part 402 calculates a maximum permissible length measurement error corresponding to a third value by calculating a plurality of variable values occurring when the measurement condition value indicating the range of temperature variation in the operating environment of the CMM is the third value, on the basis of (i) the plurality of first variable values ($A_{(T1)}$, $1/K_{(T1)}$) occurring when the measurement condition value indicating the range of temperature variation is the first value $T_1$ and (ii) the plurality of second variable values ($A_{(T2)}$, $1/K_{(T2)}$) occurring when the measurement condition value indicating the range of temperature variation is the second value $T_2$.

Figure 8A:
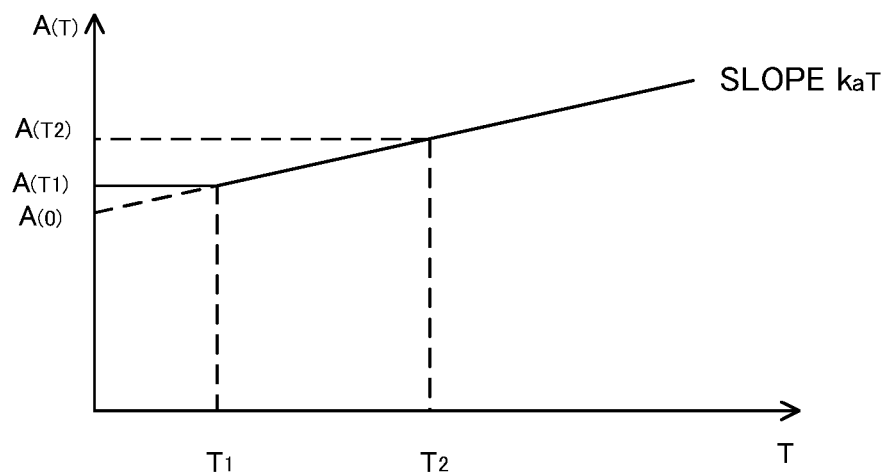
FIGS. 8A and 8B each show an example of a calculation of the variable value by the calculation part.
Figure 8B:
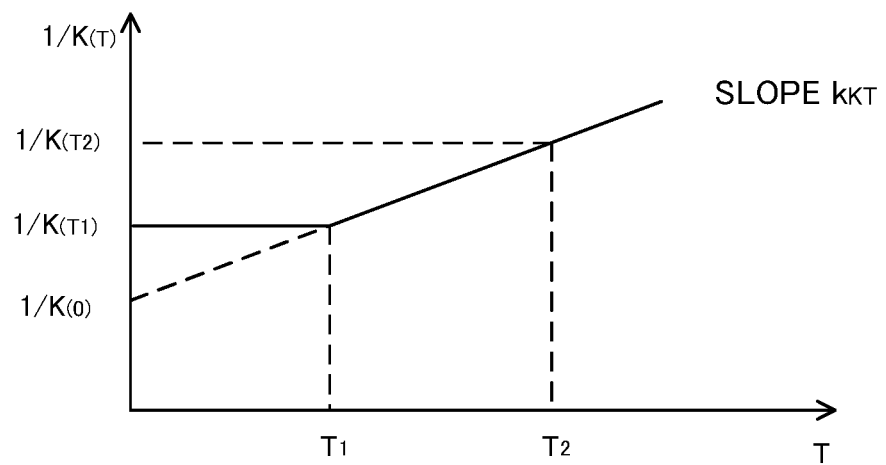

FIGS. 8A and 8B each show an example of a calculation of the variable value by the calculation part 402. FIG. 8A shows a relationship between the measurement condition value T and the variable value $A_{(T)}$. FIG. 8B shows a relationship between the measurement condition value T and the variable value $1/K_{(T)}$. The horizontal axis of FIG. 8A is the measurement condition value T, and the vertical axis of FIG. 8A is the variable value $A_{(T)}$. As shown in FIG. 8A, the variable value $A_{(T)}$ is expressed by the following equations.

$$A_{(T)} = A_{(0)} + k_{aT} T \quad \text{[Equation 8]},$$

where $T_1 \leq T$.

$$A_{(T)} = A_{(T1)} \quad \text{[Equation 9]},$$

where $T < T_1$.

In the range of $T < T_1$, since the variable value $A_{(T)}$ is not given, it is desirable to treat the variable value $A_{(T)}$ as a constant value, as shown in Equation 9.

Here, the calculation part 402 calculates a slope $k_{aT}$ of the straight line in $T_1 \leq T$ shown in FIG. 8A with the following equation:

$$K_{aT} = (A_{(T2)} - A_{(T1)})/(T_2 - T_1) \quad \text{[Equation 10]}$$

$A_{(0)}$ is the variable value $A_{(T)}$ when T=0, and the calculation part 402 calculates $A_{(0)}$ with the following equation:

$$A_{(0)} = A_{(T1)} - (A_{(T2)} - A_{(T1)})/(T_2 - T_1) \cdot T_1 \quad \text{[Equation 11]}$$

The calculation part 402 can calculate the variable value $A_{(T)}$ with respect to the measurement condition value T indicating the temperature variation in any operating environment with Equation 8 to Equation 11.

The horizontal axis of FIG. 8B is the measurement condition value T, and the vertical axis of FIG. 8B is the variable value $1/K_{(T)}$. As shown in FIG. 8A, the variable value $1/K_{(T)}$ is expressed by the following equations:

$$1/K_{(T)} = 1/K_{(0)} + k_{kT} \cdot T \quad \text{[Equation 12]},$$

where $T_1 \leq T$.

$$1/K_{(T)} = 1/K(T_1) \quad \text{[Equation 13]}$$

where $T < T_1$.

The calculation part 402 calculates the slope $k_{KT}$ of the straight line at $T < T_1$ shown in FIG. 8B with the following equation:

$$k_{KT} = (1/K_{(T2)} - 1/K_{(T1)})/(T_2 - T_1) \quad \text{[Equation 14]}$$

$1/K_{(0)}$ is the variable value $1/K_{(T)}$ when T=0, and the calculation part 402 calculates $K_{(0)}$ with the following equation:

$$1/K_{(0)} = 1/K_{(T1)} - (1/K_{(T2)} - 1/K_{(T1)})/(T_2 - T_1) \cdot T_1 \quad \text{[Equation 15]}$$

The calculation part 402 can calculate the variable value $1/K_{(T)}$ with respect to the measurement condition value T indicating a variation in temperature in an arbitrary operating environment from Equations 12 to 15.

[Effect of the CMM According to the Second Embodiment]

According to the second embodiment, the calculation part 402 calculates the maximum permissible length measurement error $E_{(T),MPE}$ corresponding to the third value by calculating the plurality of variable values occurring when the measurement condition value indicating the range of temperature variation is the third value using the plurality of first variable values and the plurality of second variable values acquired by the acquisition part 401. The estimation part 403 estimates the uncertainty in the measurement performed by the CMM 100 using the maximum permissible length measurement error $E_{(T),MPE}$ calculated by the calculation part 402. By doing this, the estimation part 403 can improve estimation accuracy of the measurement uncertainty of the CMM when the measurement condition value indicating the range of temperature variation is different from the value stored as the product specifications in the storage 3.

Further, the estimation method for the measurement uncertainty of the CMM 100 according to the first embodiment and the estimation method for the measurement uncertainty of the CMM 100 according to the second embodiment may be combined. In this way, the estimation part 403 can improve the accuracy of estimating the measurement uncertainty of the CMM 100 when the measurement condition value indicating the range of temperature variation is different from the value stored as the product specifications in the storage 3 and the ram axis stylus tip offset L is different from the value stored as the product specifications in the storage 3 due to a change in the orientation of the probe.

The present disclosure is explained based on the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

What is claimed is:

1. An uncertainty estimation method conducted by a processor, which is an uncertainty estimation method for estimating measurement uncertainty of a coordinate measuring machine, comprising:

acquiring a plurality of first variable values A1 and K1, included in a function $E=\pm(A+D/K)$ indicating a relationship between a measurement dimension and a maximum permissible length measurement error, where A represents an intercept at the measurement dimension 0 of a function indicating the relationship between the measurement dimension of the coordinate measuring machine and the maximum permissible length measurement error, 1/K represents a proportionality coefficient of a measurement error, and D represents a distance between two points on the object to be measured, when a ram axis stylus tip offset of the coordinate measuring machine or an operating environment of the coordinate measuring machine is a first value, and a plurality of second variable values A2 and K2, included in the function when the ram axis stylus tip offset is a second value;

calculating a maximum permissible length measurement error corresponding to a third value by calculating the plurality of variable values of the function, A3 and K3, occurring when the ram axis stylus tip offset is the third value, by interpolation or extrapolation on the basis of the A1 and K1 occurring when the ram axis stylus tip offset is the first value and the A2 and K2 occurring when the ram axis stylus tip offset is the second value;

estimating the measurement uncertainty of the coordinate measuring machine on the basis of the calculated maximum permissible length measurement error; and controlling a measuring mechanism of the coordinate measuring machine to execute measurement by the coordinate measuring machine when the estimated uncertainty is less than a predetermined threshold and to stop the measurement by the coordinate measuring machine when the estimated uncertainty is equal to or greater than the predetermined threshold.

2. The uncertainty estimation method according to claim 1, wherein the acquiring includes acquiring the plurality of first variable values included in the function indicating a relationship between a measurement dimension and a maximum permissible length measurement error when the ram axis stylus tip offset indicating a range of temperature variation in the operating environment of the coordinate measuring machine is a first value, and the plurality of second variable values occurring when the ram axis stylus tip offset indicating the range is a second value, and the calculating includes calculating the maximum permissible length measurement error corresponding to the third value by calculating the plurality of variable values occurring when the ram axis stylus tip offset indicating the range is the third value, on the basis of the plurality of first variable values occurring when the ram axis stylus tip offset indicating the range is the first value and the plurality of second variable values occurring when the ram axis stylus tip offset indicating the range is the second value.

3. The uncertainty estimation method according to claim 1, wherein the acquiring includes acquiring the plurality of first variable values stored in a storage in association with the first value and acquiring the plurality of second variable values stored in the storage in association with the second value by referencing the storage that stores the first value in association with the plurality of first variable values and stores the second value in association with the plurality of second variable values.

4. A non-transitory storage medium storing a program for estimating measurement uncertainty of a coordinate measuring machine, the program causing a computer to execute:

acquiring a plurality of first variable values A1 and K1, included in a function $E=\pm(A+D/K)$ indicating a relationship between a measurement dimension and a maximum permissible length measurement error, where A represents an intercept at the measurement dimension 0 of a function indicating the relationship between the measurement dimension of the coordinate measuring machine and the maximum permissible length measurement error, 1/K represents a proportionality coefficient of a measurement error, and D represents a distance between two points on the object to be measured, when a ram axis stylus tip offset of the coordinate measuring machine or an operating environment of the coordinate measuring machine is a first value, and a plurality of second variable values A2 and K2, included in the function when the ram axis stylus tip offset is a second value;

calculating a maximum permissible length measurement error corresponding to a third value by calculating the plurality of variable values of the function, A3 and K3, occurring when the ram axis stylus tip offset is the third value, by interpolation or extrapolation on the basis of the A1 and K1 occurring when the ram axis stylus tip offset is the first value and the A2 and K2 occurring when the ram axis stylus tip offset is the second value;

estimating the measurement uncertainty of the coordinate measuring machine on the basis of the calculated maximum permissible length measurement error; and controlling a measuring mechanism of the coordinate measuring machine to execute measurement by the coordinate measuring machine when the estimated uncertainty is less than a predetermined threshold and to stop the measurement by the coordinate measuring machine when the estimated uncertainty is equal to or greater than the predetermined threshold.

* * * * *